April 25, 1950 — C. HINDS — 2,505,400
FASTENER FOR DOORS
Filed Feb. 3, 1948 — 2 Sheets-Sheet 1
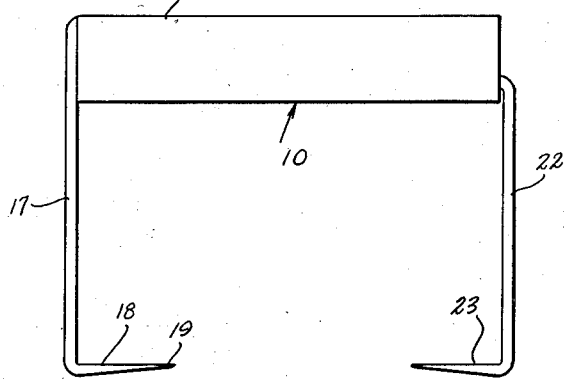
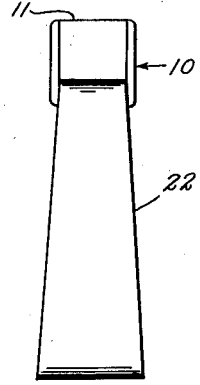
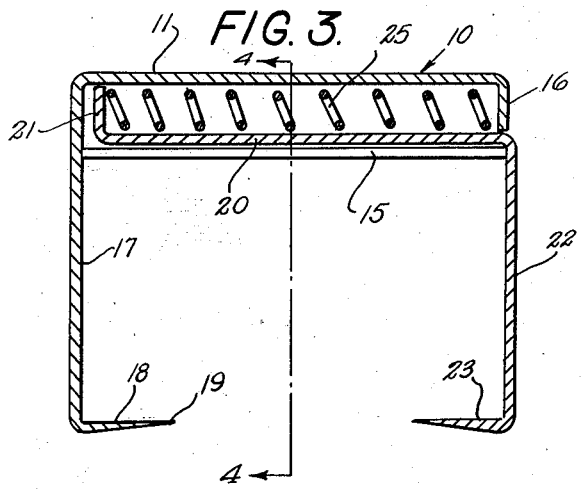
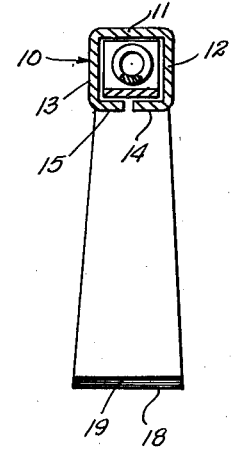
INVENTOR.
CYRIL HINDS,
BY
McMorrow, Berman & Davidson
ATTORNEYS.

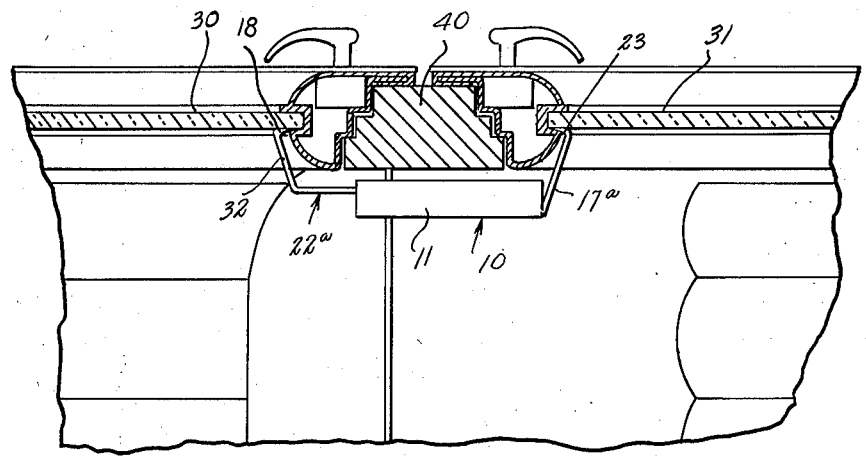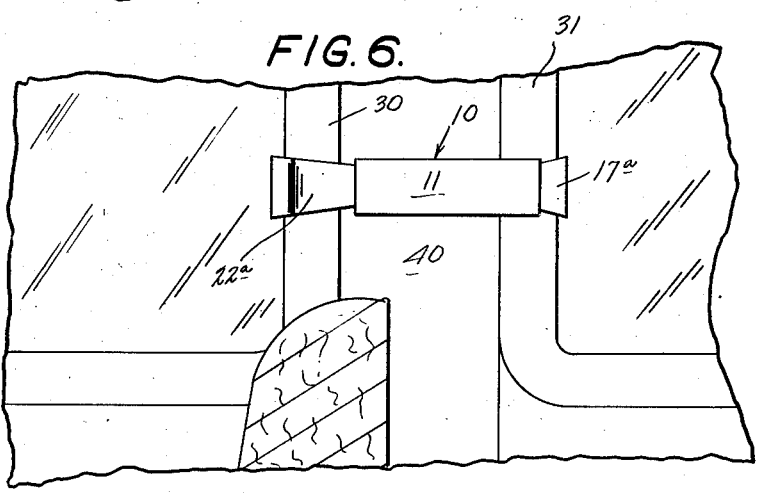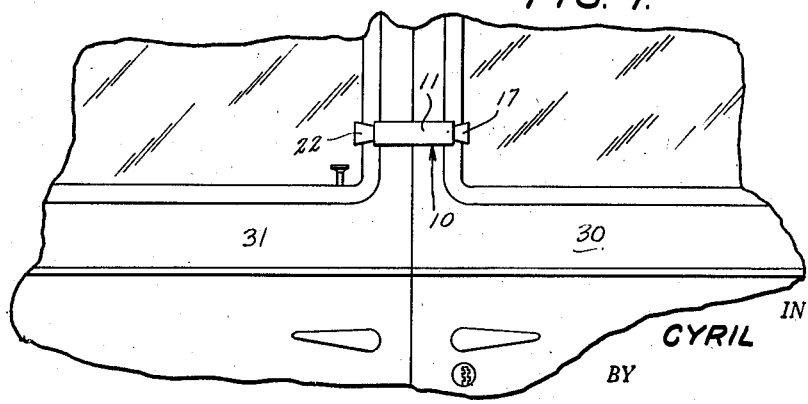

Patented Apr. 25, 1950

2,505,400

UNITED STATES PATENT OFFICE 2,505,400

FASTENER FOR DOORS

Cyril Hinds, New Orleans, La.

Application February 3, 1948, Serial No. 5,982

2 Claims. (Cl. 292—288)

This invention relates to fasteners for doors.

An object of the invention is the provision of a fastener which may be employed for securing the doors of an automobile against unauthorized or accidental opening when driving along a highway to prevent any of the occupants of the vehicle, particularly children, from falling from the automobile, said fastener including spring-actuated gripping means adapted to engage adjacently disposed portions of a pair of doors at one side of the vehicle to prevent opening of either door. Said device also being employed to retain a door shut when the lock or the handle operating mechanism has been broken.

A further object of the invention is the provision of a simply constructed and efficient fastener which may be readily applied to or removed from a pair of doors of an automobile for preventing accidental or unauthorized opening of said doors, said device including a pair of movable elements with a door gripping means depending from each element and a coil spring disposed in a housing formed integrally with one of the elements for restraining movement of the elements and the gripping means relative to each other and for retaining the gripping means on adjacent portions of the frames of a pair of automobile doors to retain the doors closed.

The invention consists in the novel construction, arrangement and combinations of parts hereinafter more particularly described and claimed.

In the drawings:

Figure 1 is a plan view of my door fastener.

Figure 2 is an end view of the fastener.

Figure 3 is a horizontal section of the fastener.

Figure 4 is a transverse vertical section taken along the line 4—4 of Figure 3.

Figure 5 is a fragmentary horizontal section of a pair of automobile doors showing a modified form of the fastener applied thereto.

Figure 6 is a fragmentary inside view in elevation of a pair of automobile doors connected together by the modified form of the fastener.

Figure 7 is a fragmentary outside view in elevation of a pair of automobile doors showing the fastener applied to the exterior portions of the doors.

Referring more particularly to the drawing, 10 designates an elongated housing which is rectangular in cross section as shown in Figure 4. Said housing is stamped from a blank which had been cut previously from a sheet of metal of sufficient thickness to provide the necessary rigidity and strength for the purpose. In view of the fact that the device must be in a horizontal plane for practical operation, the portion 11 of the housing will be defined as the main or front wall from which extends in integral formation a top wall 12 and a bottom wall 13 parallel to the top wall. The free ends or flanges on the top and bottom walls are bent inwardly at right angles towards each other, as shown respectively at 14 and 15 to form a rear wall. The front wall 11 is longer than the walls 12 and 13 to provide a closure 16 at one end of the housing. This closure or end wall is bent at right angles to the wall 11.

An arm 17 extends substantially at right angles from the other end of the front wall 11 past the adjacent end of the rear wall and is formed integrally with said front wall. A gripping jaw 18 having a reduced free edge 19 is disposed at right angles to the arm 17 the end of the latter being remote from said front wall and is integral therewith. Said arm, where joined to the wall 11, forms a closure for the adjacent end of the housing 10.

A slide 20 is located in the housing 10 and is adapted to be reciprocated on the rear wall formed by the inturned flanges 14 and 15 which lie in the same plane. One end of the slide is bent upwardly at 21 to provide an end wall adjacent the inner end of the arm 17. The slide passes through a slot or space between the free end of the member 16 and the flanges 14 and 15. An arm 22 integral with the slide 20 extends perpendicularly from the end of the slide remote from the arm 17 in the same direction relative to the housing 10 as that in which the arm 17 extends.

A gripping jaw 23 is right-angularly positioned on the free end of the arm 22 and projects towards the jaw 18. The jaws 18 and 23 are in the same plane. The jaw 23 has a reduced free edge 24.

A compression spring 25 is disposed in the housing and encompassed by the slide 20 and the walls 11, 12 and 13. One end of the spring abuts the member 21 on the slide while the other end bears against the member 16 of the housing. Thus, the spring will, at all times, resist displacement of the arms 17 and 22 and will return said arms to the normal inoperative positions shown in Figure 3, after displacement and release.

In constructing the fastening device, the walls 12, 13 and the arm 17 are bent at right angles to the wall 11 as shown in Figures 3 and 4. The flanges 14 and 15 are likewise bent inwardly to provide an elongated chamber. The slide 20 is inserted into said chamber with the flange 21 being moved to the inner extreme end of said chamber. The coil spring 25 is placed in the chamber after which the flange or closure 16 is pressed into place against the outer end of the spring. The fastener is now ready for application to a pair of automobile doors.

In Figure 5 is illustrated a slightly modified form of the attaching device shown applied to a pair of automobile doors 30 and 31. In this case, the arm 22a is longer than the arm 17a and is provided with an angular bent portion 32 for placing the gripping jaw 18 in alignment with the jaw 23 on the arm 17a since the arm 22a is in a plane parallel to the side wall 11 of the housing 10. The arm 17a is bent at an acute angle to the wall 11 of the housing.

In application, either jaw 18 or 23 may be placed in engagement with the usual felt carried by a side portion of an automobile door while the housing spans the post 40. The arm having the free jaw is drawn away from the other arm until the free jaw clears the adjacent upright of the other door. The free jaw is moved inwardly for engagement with the felt on the second door and the arm is released. The doors will be held against accidental or unauthorized opening by the fastener. An inspection of Figures 6 and 7 will show that the fastener may be applied interiorly or exteriorly of the doors.

It is to be borne in mind that either arm 17 or 22 may be drawn outwardly against the tension of the compression spring 25 when one of the respective jaws 18 or 23 has been placed in engagement with an element of a door. The fact that either arm may be moved relatively to the other provides for ready application of the fastener since it is unnecessary to set a particular jaw in a fixed position.

When the lock or latching mechanism of a door has become inoperative, the fastener may be installed on the inside of a pair of doors, including the one having the inoperative locking mechanism to prevent unauthorized entry of the automobile. The other door is locked for cooperation with the fastener.

The fastener is employed particularly for preventing deliberate or accidental opening of the doors of an automobile when children are carried therein. When the automobile is traveling along a roadway and a door is opened the rush of the wind will thrust the door rearwardly and throw the individual grasping the door handle into the roadway. With the fastener applied as shown, the handle may be operated without danger.

What is claimed is:

1. A fastener for a pair of automobile doors comprising a housing having one end closed, said closed end having a slot, a slide in the housing and movable in the slot, an arm projecting angularly from the outer end of the slide, said slide having a right angular flange at the inner end, a compression spring between the flange and the closed end of the housing, an arm projecting angularly from the housing in spaced relation with the first-mentioned arm, and a door-gripping means on each free end of the arms, said gripping means facing each other and disposed substantially in the same plane.

2. A resilient fastener comprising an elongated housing having at one end an arm extending substantially perpendicularly therefrom and a slotted end wall at its opposite end, a slide extending through said end wall into said housing, an arm integral with the end of said slide outside of said housing and extending substantially at right angles from said slide in the same direction relative to said housing as that in which said first mentioned arm extends, a flange on the other end of said slide disposed substantially at right angles to the latter, a compression spring in said housing having its opposite ends respectively abutting the flange on said slide and said housing end wall to resiliently urge said slide inwardly of said housing and said arms toward each other, and respective gripping jaws on the distal ends of said arms, said jaws being disposed substantially at right angles to said arms and facing each other.

CYRIL HINDS.

REFERENCES CITED

The following references are of record in the file of this patent:

UNITED STATES PATENTS

| Number | Name | Date |
|---|---|---|
| 977,765 | White | Dec. 6, 1910 |
| 2,010,317 | Olson | Aug. 6, 1935 |
| 2,396,479 | Votaw | Mar. 12, 1946 |